United States Patent
Choi et al.

(10) Patent No.: US 6,581,034 B1
(45) Date of Patent: Jun. 17, 2003

(54) PHONETIC DISTANCE CALCULATION METHOD FOR SIMILARITY COMPARISON BETWEEN PHONETIC TRANSCRIPTIONS OF FOREIGN WORDS

(75) Inventors: Key-Sun Choi, Taejon (KR); Byung-ju Kang, Taejon (KR)

(73) Assignee: Korea Advanced Institute of Science and Technology, Taejon-si (KR)

( * ) Notice: Subject to any disclaimer, the term of this patent is extended or adjusted under 35 U.S.C. 154(b) by 0 days.

(21) Appl. No.: 09/483,860

(22) Filed: Jan. 17, 2000

(30) Foreign Application Priority Data

Oct. 1, 1999 (KR) .............................. 99-42372

(51) Int. Cl.$^7$ .......................... G10L 15/10; G06F 17/21
(52) U.S. Cl. ......................... 704/238; 704/10
(58) Field of Search ............................ 704/10, 1, 238, 704/235; 707/535

(56) References Cited

U.S. PATENT DOCUMENTS 5,218,536 A * 6/1993 McWherter ................. 707/533
6,256,630 B1 * 7/2001 Gilai et al. ................. 704/239

OTHER PUBLICATIONS

Zobel, J., "Phonetic string matching: lessons from information retrieval", Proceedings of the 19th annual international ACM SIGR conference on Research and development in information retrieval, 1996, Zurich, Switzerland.*

"Approximate String Matching", by Patrick A. V. Hall et al., Computing Surveys, vol. 12, No. 4, published Dec. 1980.

* cited by examiner

*Primary Examiner*—Marsha D. Banks-Harold
*Assistant Examiner*—V. Paul Harper
(74) *Attorney, Agent, or Firm*—Bachman & LaPointe, P.C.

(57) ABSTRACT

A phonetic distance calculation method for similarity comparison between phonetic transcriptions of foreign words. A system manager defines character element transformation patterns occurrable between phonetic transcriptions derived from the same foreign language. A system generates new phonetic transcriptions according to the defined character element transformation patterns and assigns a demerit mark to each of the generated phonetic transcriptions according to a phonetic distance. A minimum phonetic distance between each of the generated phonetic transcriptions and a given phonetic transcription is calculated on the basis of a minimum edit distance calculation method. Any one of the generated phonetic transcriptions with a smallest one of the calculated minimum phonetic distances is determined to be most similar to the given phonetic transcription. Therefore, a document retrieval operation can accurately be performed in a document retrieval system and a document retrieval time can be reduced therein, resulting in a significant improvement in the performance of the document retrieval system.

1 Claim, 1 Drawing Sheet

PHONETIC DISTANCE CALCULATION METHOD FOR SIMILARITY COMPARISON BETWEEN PHONETIC TRANSCRIPTIONS OF FOREIGN WORDS

BACKGROUND OF THE INVENTION

1. Field of the Invention

The present invention relates in general to a phonetic distance calculation method for similarity comparison between phonetic transcriptions of foreign words, and more particularly to an improved phonetic distance calculation method which is capable of applying an edit distance measure, generally used for word spelling comparison, to phonetic transcriptions of foreign words, so that the phonetic transcriptions can effectively be retrieved in a document retrieval system.

2. Description of the Prior Art

In order to efficiently utilize a document keeping space with techniques of a computer field being developed, it is common that documents are not kept in the form of paper, but converted into information data and stored in computers.

To this end, there has been proposed a document retrieval system for rapidly retrieving a desired one from the stored documents. The document retrieval system presents all documents containing similar contents using keywords, resulting in an increase in convenience to the user.

On the other hand, with various exchanges with foreign countries recently increasing, phonetic transcriptions of many foreign words have been used in Korean documents. Most of the phonetic transcriptions are concerned with proper nouns or technical terms originally expressed in English. In particular, it is common that scientific and technological fields have no choice but to employ the phonetic transcriptions, because there is no Korean translation for such English technical terms. However, there is a severe individual difference in the phonetic transcriptions of the foreign words, thus making it difficult to retrieve Korean document texts on the basis of such phonetic transcriptions.

For example, three Korean phonetic transcriptions such as "z,1", "z,2" and "z,3" may be used together with respect to an English technical term "digital". Among these Korean phonetic transcriptions, the "z,4" has been proposed as a standard, but the "z,2" has actually been more frequently used and, occasionally, the "z,3" has been used according to private views.

For this reason, documents with various phonetic transcriptions may not often be retrieved unless a diversity of the phonetic transcriptions is considered in the document retrieval.

In order to overcome such a problem, there has been proposed a method for grouping various Korean phonetic transcriptions derived from the same foreign word into an equivalence class and automatically expanding them upon document retrieval [see: Jeong, K. S., Kwon, Y. H., and Myaeng, S. H., "The Effect of a Proper Handling of Foreign and English Words in Retrieving Korean Text", In Proceedings of the 2nd International Workshop on Information Retrieval with Asian Languages (IRAL '97), 1997].

The creation of such a phonetic transcription equivalence class requires a method for determining whether two given phonetic transcriptions are derived from the same foreign word, namely, for comparing a similarity between the two phonetic transcriptions.

The above phonetic transcription similarity comparison method is also basically necessary to an approximate search for a phonetic transcription (words of foreign origin) database. For example, the similarity comparison method may be usefully utilized for the search for either firm names or trademarks of words of foreign origin.

Unfortunately, it is the reality that no method has been developed until now for similarity comparison between Korean phonetic transcriptions and an edit distance measure (see: Hall, P. and Dowling, G., "Approximate string matching", Computing Surveys, Vol. 12, No. 4, pp. 381–402, 1980) or an N-gram metric (see: Zamora, E., Pollock, J., and Zamora, A., "The use of trigram analysis for spelling error detection", Information Processing & Management, Vol. 17, No. 6, pp 305–316, 1981) has merely been utilized as an approach to the similarity comparison. Either the edit distance measure or N-gram metric is a character string similarity comparison method which is independently applicable to words.

The character string similarity comparison method is to detect whether two given character strings are similar in spelling. Because Korean words are spelled using phonetic symbols, they are liable to be analogously pronounced if they are similar in spelling. In this connection, the character string similarity comparison method may relatively effectively be utilized for similarity comparison between Korean phonetic transcriptions.

Now, a description will be given of a conventional method for similarity comparison between phonetic transcriptions of foreign words.

Fred J. Damerau has proposed a method for assuming that typing errors result from only four cases; (1) insertion of one character, (2) deletion of one character, (3) substitution of one character with a different one and (4) transposition of two adjacent characters, and measuring a similarity between two given words on the basis of the minimum number of typing errors between the two words (see: Damerau, F., "A technique for computer detection and correction of spelling errors", Communications of the ACM, 7, pp. 171–176, 1964). This metric is typically called a Damerau-Levenshtein metric or an edit distance measure. The minimum number of typing errors between two words s and t can be calculated on the basis of the following recurrent equation (see: Wagner, R. A., "Order-n correction for regular languages", Communications of the ACM, vol. 17, No. 5, pp. 265–268, 1974):

$$f(0, 0) = 0$$
$$f(i, j) = \min\{$$
$$\quad f(i-1, j) + 1, \qquad \text{/*Insertion*/}$$
$$\quad f(i, j-1) + 1, \qquad \text{/*Deletion*/}$$
$$\quad f(i-1, j-1) + d(s_i, t_j), \qquad \text{/*Substitution*/}$$
$$\quad f(i-2, j-2) + d(s_{i-1}, t_j) + d(S_i, t_{j-1}) + 1\} \qquad \text{/*Transposition*/}$$

Here, the function d is a distance between two characters and can simply be expressed by the following equation:

$$d(s_i, t_j) = \begin{cases} 0 \text{ if } s_i = t_j \\ 1 \text{ if } s_i \neq t_j \end{cases}$$

It should be noted that the distance function d may be expressed by a more complex equation according to a desired purpose.

In the case where the above edit distance measure is applied to similarity comparison between Korean phonetic transcriptions, it is effective to consider only the insertion, deletion and substitution because the transposition is valid with respect to only the typing error cases. It is further effective to perform the similarity comparison after the removal of an initial phoneme 'ㅇ' in the Korean phonetic transcriptions because it has no phonetic value.

The above edit distance measure or N-gram metric is a word spelling comparison method which is independently applicable to words and can relatively effectively be utilized for similarity comparison between Korean phonetic transcriptions. However, this edit distance measure or N-gram metric is not the best for pronunciation similarity comparison. For example, Korean phonetic transcriptions "디지들" and "디지트" are very similar in spelling, but come from different English technical terms "digital" and "digit", respectively. For this reason, the conventional word spelling comparison method has a difficulty in performing similarity comparison between such Korean phonetic transcriptions.

Accordingly, the phonological structure of a foreign language as the origin should be considered for the effective similarity comparison between Korean phonetic transcriptions. For example, a Korean phonetic transcription "로봇" of an English word "robot" is similar in English-style pronunciation to a Korean phonetic transcription "로볻ㅌ" with two different character elements, rather than a Korean phonetic transcription "로봍" with one different character element. This results from the fact that a final phoneme /t/ of the English word is usually changed to a Korean phoneme /ㅅ */ or "ㅌ", where the symbol * indicates that /ㅅ / is a final consonant.

Consequently, the above-mentioned conventional method is effective in performing the word spelling comparison, but it has a difficulty in performing the pronunciation similarity comparison. As a result, an undesired document is retrieved or a desired document is not retrieved in a document retrieval system. In other words, a document retrieval operation cannot accurately be performed in the document retrieval system.

SUMMARY OF THE INVENTION

Therefore, the present invention has been made in view of the above problem, and it is an object of the present invention to provide a phonetic distance calculation method for similarity comparison between phonetic transcriptions of foreign words, which is capable of defining character element transformation patterns liable to occur between phonetic transcriptions coming from the same foreign language, assigning a demerit mark to each of the character element transformation patterns according to a phonetic distance and calculating a minimum phonetic distance between two given phonetic transcriptions on the basis of a minimum edit distance calculation method used in an edit distance measure, so that a document retrieval operation can accurately be performed in a document retrieval system.

In accordance with the present invention, the above and other objects can be accomplished by a provision of a phonetic distance calculation method for similarity comparison between phonetic transcriptions of foreign words, comprising the first step of defining character element transformation patterns occurrable between phonetic transcriptions derived from the same foreign language; the second step of generating new phonetic transcriptions according to the defined character element transformation patterns and assigning a demerit mark to each of the generated phonetic transcriptions according to a phonetic distance; the third step of calculating a minimum phonetic distance between each of the generated phonetic transcriptions and a given phonetic transcription on the basis of a minimum edit distance calculation method; and the fourth step of determining that any one of the generated phonetic transcriptions with a smallest one of the calculated minimum phonetic distances is most similar to the given phonetic transcription.

Preferably, the above first step may include the step of classifying the character element transformation patterns into three types; substitution of one character element with a different one, insertion or deletion of one character element and expansion of one character element into two character elements or contraction of two consecutive character elements into one character element, classifying the three types of character element transformation patterns into consonants and vowels and then classifying the consonants into final and initial consonants.

Further, preferably, the above second step may include the step of assigning the demerit mark to each of the generated phonetic transcriptions according to a minimum amount of transformation operation required for the transformation of a corresponding one of the generated phonetic transcriptions into a different one.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
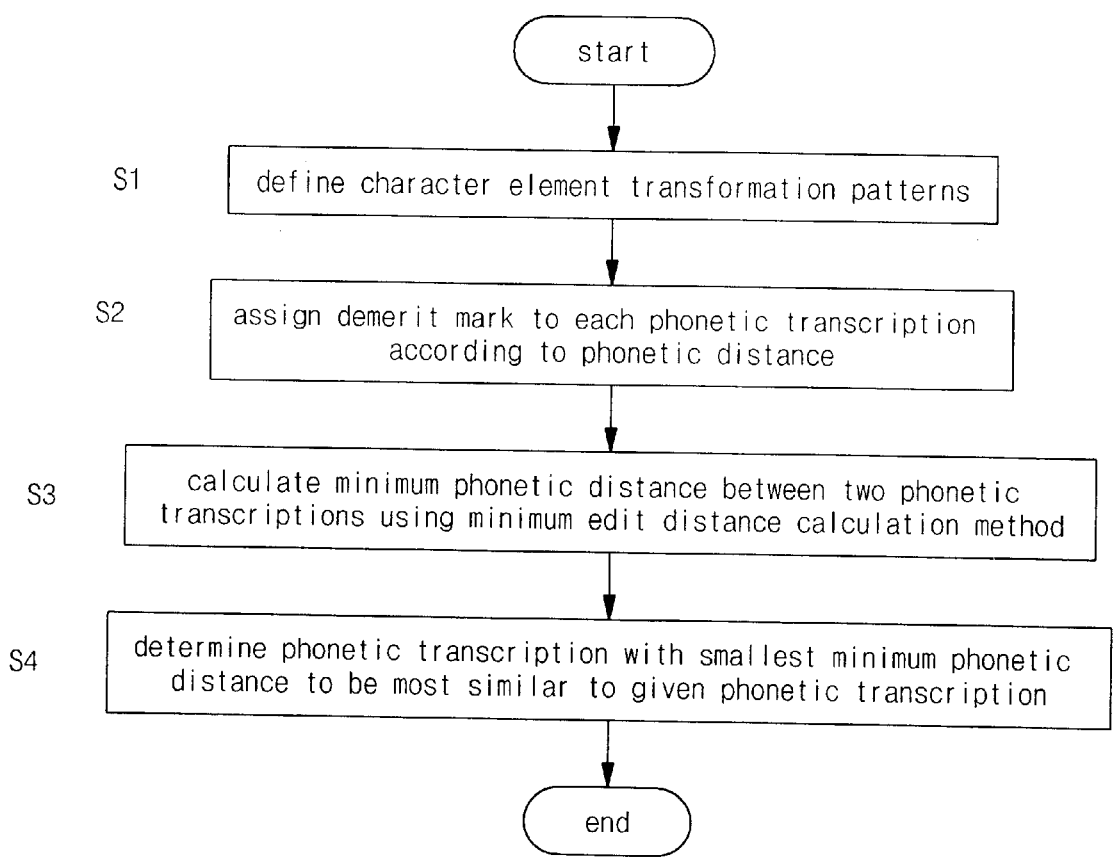
FIG. 1 is a flowchart illustrating a phonetic distance calculation method for similarity comparison between phonetic transcriptions of foreign words in accordance with the preferred embodiment of the present invention.

An edit distance measure is generally adapted to calculate the amount of edit operation to be required between two words. The edit distance measure can relatively effectively be used for comparison between Korean phonetic transcriptions, but it may encounter various problems in performing phonetic similarity comparison between the Korean phonetic transcriptions, because it is based on possible types of typing errors. Namely, a phonetic distance calculation operation is required for the phonetic similarity comparison between the Korean phonetic transcriptions since the phonetic similarity comparison must be achieved on the basis of a phonetic distance, not an edit distance.

In order to perform a phonetic distance calculation method corresponding to the edit distance measure, it is necessary to first find out types of character element transformation patterns between similar phonetic transcriptions. To this end, the present applicant observed a large amount of phonetic transcription data and consequently discovered three types of representative character element transformation patterns relatively frequently occurring between phonetic transcriptions coming from the same foreign language, which are shown in the below table 1.

TABLE 1 substitution of one character element with a different one
Insertion or deletion of one character element
expansion of one character element into two character elements or contraction of two consecutive character elements into one character element The three types of character element transformation patterns in the above table 1 can be subdivided by classifying character elements into vowels and consonants and, in turn, the consonants into initial and final consonants. Various algorithms can be created according to degrees of the subdivision, which is shown in the following table 2.

TABLE 2

| | Character element transformation patterns | Edit distances | $KPDM_V$ | $KPDM_{VC}$ | $KPDM_{VCC}$ | $KPDM_{ec}$ |
|---|---|---|---|---|---|---|
| Substitution | Accurate match | 0 | 0 | 0 | 0 | 0 |
| | Vowel/vowel | 1 | 1 | 1 | 1 | 1 |
| | Consonant/consonant | | | 2 | 2 | 2 |
| Insertion/ | Vowel | 1 | 1 | 1 | 1 | 1 |
| Deletion | Final consonant | | | 2 | 2 | 2 |
| | Initial consonant | | | | 3 | 3 |
| Expansion | Vowel/vowel + vowel | | | | | 1 |
| Contraction | Final/initial + vowel | | | | | 2 |

The above table 2 shows various algorithm modifications based on degrees of the subdivision of the character element transformation patterns, wherein the numerals represent demerit marks.

It can be seen from the above table 2 that the existing edit distance algorithm is the simplest algorithm and a higher subdivision degree enables a more exquisite calculation for similarity between phonetic transcriptions. That is, the edit distance algorithm corresponds to the case where it is considered only whether character elements are matched with each other, the KPDMv algorithm corresponds to the case where character elements are classified into only vowels, and the KPDMvc algorithm corresponds to the case where character elements are classified into vowels and consonants. Further, the algorithm KPDMvcc corresponds to the case where character elements are classified into vowels and consonants and, in turn, the consonants are classified into initial and final consonants, and the algorithm KPDMec corresponds to the case where even expansion or contraction of character elements is considered.

The below table 3 shows a concrete example of the character element transformation patterns.

TABLE 3

| Character element transformation patterns | | Demerit marks | Examples |
|---|---|---|---|
| Substitution | Accurate match | 0 | |
| | Vowel/vowel | 1 | 데이타/데이터 |
| | Consonant/consonant | 2 | 알고리즘/알고리듬 |
| Insertion/ | Vowel | 1 | 모율딩/몰딩 |
| Deletion | Final consonant | 2 | 넛트/너트 |
| | Initial consonant | 3 | 카냐/캬약 |
| Expansion/ | Vowel/vowel + vowel | 1 | 라디오/레이디오 |
| Contraction | Final/initial + vowel | 2 | 로봇/로보트 |

The following table 4 shows a recurrent equation for the phonetic distance calculation based on the above-mentioned character element transformation patterns in accordance with the present invention.

TABLE 4

$f(0, 0) = 0$
$f(i, j) = \min\{$
$\quad f(i-1, j-1) + d1 (s_i, t_j),$ /*Substitution*/
$\quad f(i-1, j) + d2 (s),$ /*Deletion*/
$\quad f(i, j-1) + d2 (t_j),$ /*Insertion*/
$\quad f(i-1, j-2) + d3 (s_i, t_{j-1}, t_j),$ /*Expansion*/
$\quad f(i-2, j-1) + d4 (s_{i-1}, s_i, t_j)\}$ /*Contraction*/

Accordingly, in the algorithm KPDMec, a minimum total value of demerit marks between two phonetic transcriptions s and t can be obtained from the recurrent equation in the above table 4, and, further, efficiently calculated on the basis of a dynamic programming method. Here, the distance functions d1, d2, d3 and d4 can be defined as in the following table 5.

TABLE 5

| Functions | Values | x | y | z |
|---|---|---|---|---|
| d1(x,y) = | 0 | x,y = accurate match | | |
| substitution | 1 | Vowel | Vowel | |
| | 2 | Consonant | Consonant | |
| D2(x) = | 1 | Vowel | | |
| Insertion/ | 2 | Final consonant | | |
| Deletion | 3 | Initial consonant | | |
| d3(x,y,z) = | 1 | Vowel | Vowel | Vowel |
| Expansion | 2 | Final consonant | Initial consonant | Vowel |
| d4(x,y,z) = | 1 | Vowel | Vowel | Vowel |
| Contraction | 2 | Initial consonant | Vowel | Final Consonant |

Consequently, minimum phonetic distances are calculated in the above manner and a phonetic transcription with a smallest one of the calculated minimum phonetic distances is determined to be most similar to a phonetic transcription to be retrieved. In the algorithms other than KPDMec, phonetic distances can be calculated in the same manner as mentioned above.

On the other hand, the expansion/contraction patterns may encounter various problems if they are applied to all character elements. Seeing the character element transformation patterns, the possibility of the transformation of " ㅅ */ㅌ" occurring is much higher than that of the transformation of "ㅅ */ㄴ" occurring. In practice, it is not unreasonable to conclude that the transformation of "ㅅ */ㄴ" never occurs.

In this regard, in order to improve the performance of the phonetic distance calculation method, it is necessary to restrict types of concrete character element combinations satisfying the expansion/contraction patterns. For example, the types of concrete character element combinations satisfying the expansion/contraction patterns may be limited to only ones shown in the below table 6, which are considered to frequently occur.

The following table 6 shows the types of concrete character element combinations satisfying the expansion/contraction patterns.

TABLE 6

| Patterns | Concrete character element combinations |
| --- | --- |
| Final/initial + vowel | ㅅ*/ㅌㅡ, ㄱ*/ㅋㅡ, ㅂ*/ㅍㅡ, ㅂ*/ㅂㅡ, ㄱ*/ㄱㅡ, ㄹ*/ㄹㅡ |
| Vowel/vowel + vowel | ㅐ/ㅔㅣ, ㅏ/ㅓㅣ, ㅓ/ㅔㅣ, ㅠ, ㅣㅜ, ㅕ/ㅠㅕ, ㅠ/ㅣㅣ, ㅐ/ㅔㅓ |

The above table 6 represents only part of the character element transformation patterns considered to frequently occur between Korean phonetic transcriptions belonging to an equivalence class. As a result, each of the distance functions d3 and d4 in the table 5 must be modified to run only when it is satisfied with a designated character element combination.

Now, a detailed description will be given of a phonetic distance calculation method for similarity comparison between phonetic transcriptions of foreign words in accordance with the preferred embodiment of the present invention with reference to a flowchart of FIG. 1.

First, a system manager defines character element transformation patterns occurrable between phonetic transcriptions derived from the same foreign language and applies them to a system at step S1. Then, the system generates new phonetic transcriptions according to the defined character element transformation patterns and assigns a demerit mark to each of the generated phonetic transcriptions according to a phonetic distance at step S2.

Here, the character element transformation patterns are defined in the following manner. Namely, the character element transformation patterns are classified into three types; substitution of one character element with a different one, insertion or deletion of one character element and expansion of one character element into two character elements or contraction of two consecutive character elements into one character element. Further, the three types of character element transformation patterns are classified into consonants and vowels and, in turn, the consonants are classified into final and initial consonants. In order to improve the system performance, the expansion/contraction patterns are limited to the character element transformation patterns shown in the table 6. Further, the demerit marks are assigned as shown in the table 3.

After assigning the demerit marks to all the phonetic transcriptions at the above step S2, the system calculates a minimum phonetic distance between each of the phonetic transcriptions and a given phonetic transcription on the basis of a known minimum edit distance calculation method at step S3. Then, the system determines at step S4 that any one of the phonetic transcriptions with a smallest one of the calculated minimum phonetic distances is most similar to the given phonetic transcription. Here, the minimum phonetic distances are obtained from the recurrent equation in the table 4.

As apparent from the above description, according to the present invention, the phonetic distance calculation method can effectively determine which one of the phonetic transcriptions comes from the same foreign word, by comparing each of the phonetic transcriptions with a given phonetic transcription of the same foreign word. Therefore, the phonetic distance calculation method is able to effectively search phonetic transcriptions of various foreign languages used in Korean documents for various phonetic transcriptions of the same foreign word and further reduce a document retrieval time in a document retrieval system, resulting in a significant improvement in the performance of the document retrieval system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A phonetic distance calculation method for similarity comparison between phonetic transcriptions of foreign words, comprising the steps of:

a) defining character element transformation patterns occurrable between phonetic transcriptions derived from the same foreign language, by classifying said patterns into three types, substitution of one character element with a different one, insertion or deletion of one character element, and expansion of one character element into two or contraction of two consecutive character elements into one, wherein said expansion/contraction patterns are restricted to character element combinations as following table, classifying said three types into consonants and vowels, and then classifying said consonants into final and initial consonants,

| Patterns | Character element combinations |
| --- | --- |
| Final/initial + vowel | ㅅ*/ㅌㅡ, ㄱ*/ㅋㅡ, ㅂ*/ㅍㅡ, ㅂ*/ㅂㅡ, ㄱ*/ㄱㅡ, ㄹ*/ㄹㅡ |
| Vowel/vowel + vowel | ㅐ/ㅔㅣ, ㅏ/ㅓㅣ, ㅓ/ㅔㅣ, ㅠ, ㅣㅜ, ㅕ/ㅠㅕ, ㅠ/ㅣㅣ, ㅐ/ㅔㅓ | assigning a demerit mark to each of said patterns, and storing said patterns and said demerit marks into a database;

b) taking a phonetic transcription input, and generating new phonetic transcriptions for said input and assigning a demerit mark to each of said new phonetic transcriptions according to said patterns and said demerit marks in said database;

c) calculating a minimum phonetic distance between each of said new phonetic transcriptions and said input on basis of a minimum edit distance calculation method, wherein using said demerit marks; and d) considering any one of said new phonetic transcriptions with the smallest phonetic distance to be most similar to said input.

* * * * *

UNITED STATES PATENT AND TRADEMARK OFFICE
CERTIFICATE OF CORRECTION

PATENT NO.     : 6,581,034 B1
DATED          : June 17, 2003
INVENTOR(S)    : Key-Sun Choi et al.

It is certified that error appears in the above-identified patent and that said Letters Patent is hereby corrected as shown below:

Column 7,
Table 6, "ㅠ, ㅣㅜ" should be corrected as -- ㅠ/ ㅣㅜ --.

Signed and Sealed this

Fourteenth Day of October, 2003

JAMES E. ROGAN
*Director of the United States Patent and Trademark Office*